(Model.)
A. GOOD.
Door Knob Attachment.
No. 242,922.            Patented June 14, 1881.
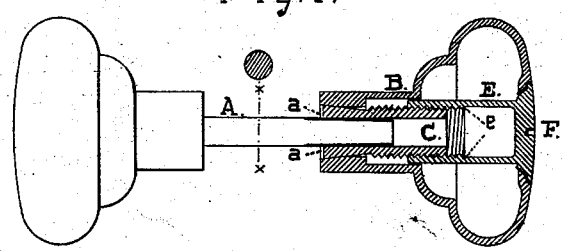
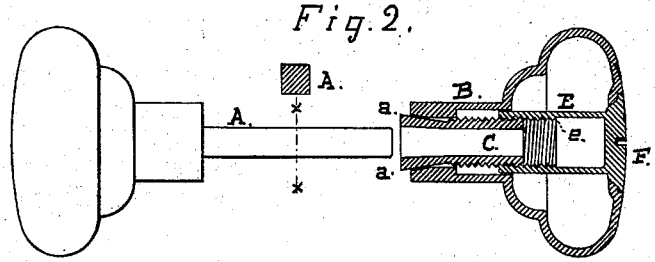
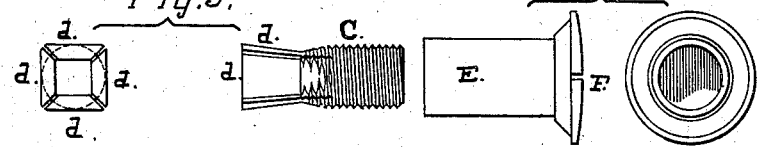
Witnesses:
Inventor:

UNITED STATES PATENT OFFICE.

ADAM GOOD, OF SAN FRANCISCO, CALIFORNIA, ASSIGNOR OF ONE-HALF TO WILLIAM H. WIESTER, OF SAME PLACE.

DOOR-KNOB ATTACHMENT.

SPECIFICATION forming part of Letters Patent No. 242,922, dated June 14, 1881.

Application filed September 3, 1880. (Model.)

*To all whom it may concern:*

Be it known that I, ADAM GOOD, of the city and county of San Francisco, in the State of California, have made and invented a new and useful Improvement in Door-Knob Attachments, which invention is fully set forth and described in the following specification and the accompanying drawings therein referred to.

My invention relates to fastening devices for securing door-knobs to their spindles; and it consists in a novel construction and combination of parts, more particularly described hereinafter, by which I afford a strong, cheap, and simple means of connecting together knobs and spindles without screws, pins, and like imperfect fastenings.

In the accompanying drawings, I have shown in Figure 1 the application of my invention to a double door knob or handle, one of the knobs and the fastening device thereof being shown in section. Fig. 2 shows a similar view, but with the spindle detached and drawn out of the knob-shank. Figs. 3 and 4 show the parts of the fastening in detail.

My improvement consists of a split sleeve placed loosely within the shank of the knob and having a longitudinal movement therein, and a screw-threaded hollow nut working through the head of the knob and engaging with the end of this sleeve to move it in and out within its socket in the shank. The split end of this sleeve receives the end of the spindle, and by turning the hollow nut in one direction the sleeve is drawn into the shank and the jaws on the split end are pressed together around and caused to gripe against the surface of the spindle, thus locking the knob securely upon the spindle.

In applying my improvement to knobs of any kind the spindle A can be of any shape in cross-section, either round, square, or polygonal, and of the same diameter throughout; but I prefer to make it usually with a slight taper at the end, gradually decreasing in diameter toward the center of the shank, so as to afford a head or enlarged end, to be griped by the jaws of the sleeve.

Within the socket of the shank B, I place the loose sleeve C, which consists of a tube having a screw-thread turned on the outer surface at one end, and a set of spring-jaws, *d d*, formed at the other and outer end by splitting it up a part of the way into several segments. The outer surface of these jaws *d* are made wedge shape, or tapering from the outer edge toward the inner end of the sleeve, so that when the sleeve is drawn into the shank the external faces of the jaws will press against and be acted upon by the contiguous surface of the socket at the end of the shank, so as to be crowded together and toward one another, while, from their construction, the jaws, when moved out from the shank, will open and move away from one another. The opening in the end of the shank is made flaring or tapering for this purpose, as is clearly shown in Figs. 1 and 2 of the drawings. The inner surface of this sleeve is made to conform generally to the shape of the end of the spindle that is to be inserted in it. If the spindle is square or other polygonal shape, the aperture within the jaws should be shaped correspondingly; or, if a round spindle is employed, the aperture should be of circular form, so that the inner faces of the jaws shall work against as much of the surface of the spindle as possible. The hollow nut for operating this sleeve consists of the tube E, with an internal screw-thread, *e*, to engage with the screw-thread on the end of the sleeve, and a head, F, which is let into the end of the knob flush with its surface, but so that it can be readily rotated in either direction within the knob by the application of a wrench or screw-driver. The rotation of this nut or tube then causes the sleeve C to move within the shank B, either outward or inward, and accordingly to the movement of the tube the jaws are either pressed tightly against and upon the spindle or are caused to release it.

This device can be applied to both knobs of a door-handle, or the spindle can be permanently fixed to one handle and the fastening used on the opposite knob. It can be employed and combined with different styles of knobs and spindles already in use; and it allows the handle to be set up and adjusted without any loose play or motion between the shank and the sides of the lock or the door.

Having thus fully described my invention, what I claim, and desire to secure by Letters Patent, is—

In combination with a door-knob having a hollow shank, B, the internally-threaded turning nut or tube E, working through the head of the knob and adapted to be operated from the outside thereof, and the screw-threaded sleeve C, fitted loosely within the shank, and having the jaws $d\ d$, which are adapted to receive and grasp the end of a spindle when inserted into the shank, and to be pressed together around the spindle as the sleeve is drawn into the shank, the said parts applied and operating together substantially as herein described, for the purpose set forth.

Witness my hand and seal.

ADAM GOOD. [L. S.]

Attest:
EDWARD E. OSBORN,
WM. F. CLARK.